(12) United States Patent
Levionnais et al.

(10) Patent No.: US 8,670,801 B2
(45) Date of Patent: Mar. 11, 2014

(54) NFC FOR MOBILE TELEPHONE

(75) Inventors: Philippe Levionnais, Caen (FR); David Picquenot, Authie (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 13/699,864

(22) PCT Filed: May 23, 2011

(86) PCT No.: PCT/FR2011/051160
§ 371 (c)(1),
(2), (4) Date: Nov. 26, 2012

(87) PCT Pub. No.: WO2011/148086
PCT Pub. Date: Dec. 1, 2011

(65) Prior Publication Data
US 2013/0072255 A1    Mar. 21, 2013

(30) Foreign Application Priority Data
May 27, 2010   (FR) ...................... 10 54119

(51) Int. Cl.
*H04M 1/00*   (2006.01)

(52) U.S. Cl.
USPC ........ 455/558; 455/41.1; 455/552.1; 455/572

(58) Field of Classification Search
USPC .............. 455/41.1, 550.1, 552.1, 561.1, 557, 455/558, 572–574
See application file for complete search history.

(56) References Cited

U.S. PATENT DOCUMENTS

| | | | |
|---|---|---|---|
| 7,181,164 B2 * | 2/2007 | Lee et al. | 455/41.2 |
| 7,395,039 B2 * | 7/2008 | Akizuki et al. | 455/127.2 |
| 7,471,963 B2 * | 12/2008 | Kim et al. | 455/562.1 |

* cited by examiner

*Primary Examiner* — Nhan Le
(74) *Attorney, Agent, or Firm* — Drinker Biddle & Reath LLP

(57) ABSTRACT

An electronic entity for a mobile terminal including a subscriber identity card and power supply therefor. The electronic entity includes a near-field communication device, an antenna, and a wire-based interface with the mobile terminal to provide the power supply. A voltage converter supplies operating power to the near-field communication device via the wire-based interface which in turn supplies power to the subscriber identity card.

9 Claims, 4 Drawing Sheets

NFC FOR MOBILE TELEPHONE

CROSS-REFERENCE TO RELATED APPLICATIONS

This application is the U.S. national phase of the International Patent Application No. PCT/FR2011/051160 filed May 23, 2011, which claims the benefit of French Application No. 1054119 filed May 27, 2010, the entire content of which is incorporated herein by reference.

FIELD

The invention relates to the field of contactless technology, and particularly the field of using such a technology in mobile communication terminals in order to execute contactless applications.

BACKGROUND

One example of an implementation of contactless applications is based on NFC technology (Near-field Communication). These contactless applications may concern, for example, electronic transactions in banking or in public transportation, or may serve as access control and identification applications. An NFC communication is established between two non-touching entities, or two NFC entities, one operating as a contactless card and the other as a contactless card reader. In another mode, called P2P mode (Peer to Peer), two NFC entities operating as contactless cards exchange data locally and therefore play an equivalent role.

Such an NFC entity consists of a near-field communication device, referred to as an NFC device below, and an associated antenna which allows it to establish contactless communication with another NFC entity. The NFC entity operating as a contactless card may correspond to an RFID (radio frequency identification) tag, for example. Depending on the application, an NFC entity operating as a card reader may correspond, for example, to an electronic payment terminal or a machine for validating public transport tickets, or a tag reader able to identify RFID tags.

The functionalities of such a contactless entity may be supplied by a mobile telephone terminal. In this case, the mobile telephone terminal contains a subscriber identity card, or SIM card (for Subscriber Identity Module), as well as an NFC device and its associated antenna.

In this context, contactless applications, which require a certain level of security, are usually installed in the SIM card or subscriber identity card of the mobile terminal A communication can thus be established within the terminal between the contactless application of the subscriber identity card and the contactless device. Then the contactless device installed on the mobile terminal allows the mobile terminal, more specifically the application concerned, to communicate with another contactless entity in proximity to the terminal. These mobile telephones can then be used as contactless cards for example.

Certain mobile terminal architectures allow cooperation between mobile telephony functionalities and NFC functionalities (Near Field Communication).

More specifically, such a mobile terminal may comprise a microprocessor to which are connected a subscriber identity card, or SIM card, and an NFC device which is itself connected to its antenna. In this type of architecture, the NFC device is welded to a printed circuit of the mobile terminal. This architecture is therefore a rigid architecture for the NFC device and SIM card together. It is not possible to change the mobile terminal while retaining the combination of the NFC device with its antenna and the SIM card. This rigidity in the architecture therefore does not allow a subscriber of a mobile communication network to change the mobile terminal independently of the components necessary for the contactless card functionalities offered by this terminal.

A system is known in the prior art which allows more flexibility in the architecture described above. It consists of connecting the NFC device to the mobile terminal at the SIM card only. This architecture renders the mobile terminal and the NFC device physically independent and thus makes it possible to change the mobile terminal, without having to change the NFC device and SIM card, by inserting the SIM card connected to the NFC device into the new mobile terminal.

However, the voltage requirements of the NFC device and the SIM card may differ or may even be incompatible. In this case, when the NFC device is only connected to the mobile terminal at the SIM card, it can become complex to create the architecture described above. It is conventional for NFC devices to require a voltage higher than a threshold voltage of 3V for example, while SIM cards generally operate with 3V or even 1.8V.

The architecture described above requires supplying an identical voltage to the NFC device and the SIM card. Due to this, compatibility problems arise between the NFC device and the SIM card because of the different voltage requirements of SIM cards. These difficulties are further increased by the fact that most SIM cards used in NFC applications are SIM-SWP (SWP for Single Wire Protocol), which have a rated operating voltage that is generally fixed at 1.8V.

SUMMARY

The invention aims to improve the situation.

A first aspect of the invention proposes an electronic entity adapted for a mobile terminal, said mobile terminal being able to comprise a subscriber identity card and able to provide a first electrical power supply suitable for operation of the subscriber identity card, said electronic entity comprising:
- a near-field communication device with which is associated a threshold operating value of the device;
- an antenna for the near-field communication device; and
- a wire-based interface intended to link the near-field communication device to the mobile terminal, said wire-based interface carrying the first electrical power supply from the mobile terminal to the near-field communication device, wherein a voltage converter receives the first electrical power supply from the mobile via the wire-based interface, and provides the near-field communication device with a second electrical power supply suitably adapted according to said threshold operating value of the device; and wherein the near-field communication device, on the basis of the second electrical power supply, provides a third electrical power supply to the subscriber identity card, said third electrical power supply having a value substantially equal to the first electrical power supply.

It should be noted that the electronic entity considered here is adapted for a mobile terminal and comprises a near-field communication device or NFC (for Near Field Communication), an antenna for this NFC device, and a wire-based interface for linking to the mobile terminal and to the SIM card.

The terms "NFC device" or "contactless device" are understood to mean an assembly comprising an NFC component, or contactless component, and other electronic components which are necessary to implement it in a circuit for use, such as capacitors or resistors for example.

In this inventive architecture, it is therefore arranged so that the mobile terminal provides, via the wire-based interface, a first electrical power supply to a voltage converter able to convert it into a second electrical power supply suitable for the NFC device. Then this second electrical power supply is used to power the subscriber identity card, or SIM card, via the NFC device. More specifically, the second electrical power supply is used by the NFC device so that it provides a third electrical power supply to the SIM card, this third electrical power supply having a value substantially equal to the first electrical power supply.

The term "substantially equal" is understood to mean a variation in equivalence of plus or minus 20%.

It is clear here that the NFC device and the SIM card can advantageously be supplied electrical power of different values, which are the first and second electrical power supplies. The NFC device is supplied power by the mobile terminal by means of an adaptation of the voltage converter, which allows providing the NFC device with a second electrical power supply using the first electrical power supply. Then the SIM card is supplied power by the NFC device which is capable of substantially recreating the first electrical power supply in the form of a third electrical power supply, provided using the second electrical power supply provided by the voltage converter. This way, even if the SIM card is ultimately powered via the NFC device in the form of a third electrical power supply, it is substantially powered according to the value of the first electrical power, meaning the power supplied by the mobile terminal. As a result, it is not powered directly by the mobile terminal but it ultimately has access to the same value for the electrical power supply as if it were powered by the mobile terminal in the conventional manner. It should be noted that this characteristic allows the nominal operation of the interaction between a mobile terminal and its SIM card, even if the NFC device is architecturally inserted between the power supplies of the mobile terminal and SIM card, meaning that the SIM card is supplied power by the NFC device and not by the mobile telephone.

In one embodiment of the invention, the SIM card comprises a chip with a microcontroller as well as memory, and it is not only used to store information specific to the mobile communication network subscriber, but also to store and execute contactless applications, such as applications requiring a certain level of security.

An NFC device intended to cooperate in this way with a SIM card generally has a power terminal, or power pin, for the SIM card with which it will be communicating. Such an architecture, with its disassociated power supplies, allows a consistent architecture that is based on adapting the power to be supplied to the SIM card by the NFC device. This architecture allows respecting the nominal operating constraints between the mobile terminal and SIM card, while providing voltages of different values to the SIM card and to the NFC device. In this manner, advantageously and regardless of the voltage, the first electrical power supply provided by the mobile terminal can be adapted into a second electrical power supply for the NFC device then reconverted into a third electrical power supply for the SIM card that is substantially equal to the first electrical power supply. This implementation is advantageously transparent to the interactions between the mobile terminal and SIM card or for any standardized interfaces between the mobile terminal and SIM card.

For example, conventionally a mobile terminal is generally arranged to supply power to different SIM cards requiring different voltages such as 1.8V and 3V. For this purpose, an exchange between the mobile terminal and the SIM card connected to it is established to allow determining the appropriate voltage to supply to the SIM card. A SIM card adapted to cooperate with an NFC device may require a voltage of 1.8V for example, while the NFC device may require 3V. Under such conditions, the third power supply, which is the one supplied by the NFC device to the SIM card and which is substantially equal to the power supplied by the mobile terminal, then corresponds to the power that it is adapted to supply to the SIM card for it to operate properly, meaning 1.8 V. Thus in one embodiment of the invention, the mobile terminal and the NFC device both supply power adapted for the SIM card, meaning 1.8V. The voltage converter is then adapted to convert the electrical power from the mobile terminal into power having a voltage of 3V, suitable for the NVC device. In this example, the mobile terminal supplies electrical power of 1.8V (suitable for the SIM card cooperating with the NFC device) to the voltage converter, which in turn supplies 3V to the NFC device, the latter ultimately supplying the SIM card with the appropriate power for its operation, i.e. the power supplied by the mobile terminal which in this case has a voltage of 1.8V.

Advantageously, such an electronic entity, with its voltage converter and its architecture with disassociated power supplies between the mobile terminal and the SIM card, allows integrating NFC functionalities into any mobile terminal while respecting the nominally established interactions between the mobile terminal and SIM card.

It is thus possible to introduce NFC functionalities into a mobile terminal without having to plan for NFC functionalities beforehand.

In general, because of the presence of the voltage converter, regardless of the voltage of the electrical power supplied to the SIM card, the NFC device can be powered according to its specifications, meaning the power supplied to it is greater than the threshold operating value associated with it.

The term "mobile terminal" is understood to mean any type of terminal which can change its location while remaining connected to a mobile communication network. This may be, for example, a mobile telephone, a computer, etc.

The term "wire-based interface" is understood to mean any set of physical connections between two electrical contacts such as the pins in an electronic device or a battery terminal. Here, this connection allows carrying electrical power between the mobile terminal and the NFC device of the electronic entity. This wire-based interface may be a plastic ribbon comprising a set of connecting wires, for example.

The term "electrical power" is understood to mean an electric current supplied in an appropriate form. Here it may be supplied as a current value, or voltage value and/or frequency value.

The term "voltage converter" is understood to mean any type of voltage converter which is able to apply a conversion ratio, i.e. a ratio of the output voltage value to the input voltage value. An integrated circuit based on capacitors can be used for this purpose. In this case, a ratio between the output voltage and the input voltage can be obtained by switching connections at the capacitors. In the architecture of the electronic entity concerned, such a voltage converter advantageously allows adapting the electrical power delivered to the NFC device from the mobile terminal, regardless of the voltage of the first electrical power supply. No limitation is placed on the term "voltage converter"; any means suitable for converting a first electrical power supply into a second electrical power supply can be used. For example, a charge pump corresponding to a circuit with capacitors can be used for this purpose, or a boost converter.

It can be arranged so that the mobile terminal is able to additionally comprise a battery suitable for connection to the wire-based interface. In this case, the first electrical power supplied by the mobile terminal is substantially that of the battery, possibly via regulating devices.

As explained above, in the conventional mobile terminal context, the first electrical power supply corresponds to a power supply providing the voltage required for the SIM card to operate.

No limitation is placed on the threshold operating values for the SIM cards and NFC devices to which an embodiment of the invention can be applied.

In this type of architecture, the electronic entity can thus only be connected to the mobile terminal by means of the wire-based interface, while being able to operate with any type of SIM card. Such characteristics advantageously allow adapting the electronic entity to any type of mobile terminal and facilitate its implementation within the mobile terminal It is important to note that the specified architecture of an embodiment of the invention easily allows using any SIM card and any NFC device, meaning an NFC device and its antenna. Thus the implementation of the invention can be based on the use of a standardized SIM card and NFC device for example. A user can therefore advantageously change the mobile terminal while retaining the same SIM card.

Here, as in a conventional NFC architecture, the antenna is connected to the NFC device and thus forms an interface between the NFC device and any contactless entity in proximity to the NFC device of the electronic entity of the mobile terminal and able to communicate with the NFC device via its antenna. It is therefore natural to provide a card emulator mode or a card reader mode for the terminal. In card emulator mode, the nearby contactless entity may correspond to a card reader of an electronic payment terminal or any other NFC card reader. In this case, the NFC device of the electronic entity can contain information specific to the user of the mobile terminal for a given contactless application. This information will be transferable to the nearby contactless entity by means of the antenna. For example, in a public transport contactless application, such information can decrement a counter associated with the number of public transport tickets the user has available.

In card reader mode, the nearby contactless entity can correspond to a card or tag, and the mobile terminal can use the NFC device to read identification data present on the card and transmitted by the antenna, for example.

It is possible for the electronic entity to additionally comprise a power connection suitable for supplying electrical power from the antenna to the near-field communication device, said near-field communication device then providing, using the electrical power from the antenna, the third electrical power supply to the SIM card via the wire-based interface. Such a supply of power can then allow certain types of transactions between a contactless application installed in the SIM card and the nearby contactless entity.

"Power connection" is understood to mean any physical connection between two entities according to an embodiment of the invention, which allows carrying electrical energy from one of the two entities to the other entity. For example, this may be a wire or cable, possibly of copper.

This embodiment is particularly advantageous in the case where the battery of the mobile terminal supplying power to the SIM card is low or even completely discharged, as it is arranged here to allow receiving electrical power from the antenna. In the "card emulator" mode described above for the NFC device, the antenna can capture the energy supplied by the nearby contactless entity in order to send it to the SIM card.

For example, the electrical power supplied in this manner by the NFC device to the SIM card, using the electrical power received from the antenna, substantially corresponds to the first electrical power supply, such as an 1.8V power supply for example.

These characteristics allow implementing a functional mode referred to by the term "battery off." Under these conditions, the SIM card is advantageously powered by the NFC device (as in the case described above), which itself is powered using the electrical power from the antenna issuing from energy captured by the antenna.

Supplying power to both the NFC device and the SIM card using energy captured by the antenna therefore allows the NFC device to operate when the battery of the mobile terminal is low. However, it should be noted that this operation is preferably a reduced functionality mode, or restricted mode or "sleep mode", in order to save energy. The NFC device is underpowered compared to its specifications for optimum operation, and even if the SIM card can be supplied power at a voltage corresponding to its optimum operating constraints, it operates in restricted mode in order to consume less electricity.

Consider an example of a mobile terminal having a SIM card for which the threshold operating value is about 1.8V. It is then possible to capture electrical energy at the antenna which allows generating a voltage of 1.8V. This voltage is supplied to the NFC device which supplies it to the SIM card.

In one embodiment, the wire-based interface is arranged to comprise a protocol connection suitable for communication between the SIM card and the near-field communication device. Thus, not only is near-field communication device inserted into the flow of power between the mobile terminal and the SIM card, but in addition the SWP-type protocol connection is also inserted between the mobile terminal and the SIM card. Thus, advantageously and transparently, it is possible to have the SIM card and near-field communication device cooperate easily even if the terminal was not initially designed for this purpose. More specifically, a mobile terminal conventionally offers a protocol connector for the SIM card. Here, this connector is masked so that the SIM card in the present architecture is connected by its protocol connector to the NFC device via the wire-based interface of the electronic entity according to an embodiment of the invention.

A second aspect of the invention proposes a mobile terminal, adapted both for operating in a communication network and for managing near-field communications, which comprises a subscriber identity card as well as an electronic entity according to the first aspect of the invention. The electronic entity comprises:
  a near-field communication device with which is associated a threshold operating value of the device;
  an antenna for the near-field communication device; and
  a wire-based interface intended to link the near-field communication device to the mobile terminal, said wire-based interface carrying the first electrical power supply from the mobile terminal to the near-field communication device,
wherein a voltage converter receives the first electrical power supply from the mobile via the wire-based interface, and provides the near-field communication device with a second electrical power supply suitably adapted according to said threshold operating value of the device; and
wherein the near-field communication device, on the basis of the second electrical power supply, provides a third electrical power supply to the subscriber identity card via the wire-based interface, said third electrical power supply having a value substantially equal to the first electrical power supply.

This mobile terminal may also be able to comprise a battery suitable for connecting to the wire-based interface.

The electronic entity may additionally comprise a power connection suitable for supplying electrical power from the antenna to the near-field communication device, wherein the near-field communication device provides, using the electrical power from the antenna, the third electrical power supply to the subscriber identity card via the wire-based interface.

The wire-based interface may comprise a protocol connection between the subscriber identity card and the near-field communication device.

A third aspect of the invention proposes a mobile communication system comprising a plurality of mobile terminals according to the second aspect of the invention.

BRIEF DESCRIPTION OF THE DRAWINGS

Other features and advantages of the invention will be apparent from the following description of some non-limiting examples, with reference to the attached drawings in which.

DETAILED DESCRIPTION

Figure 1:
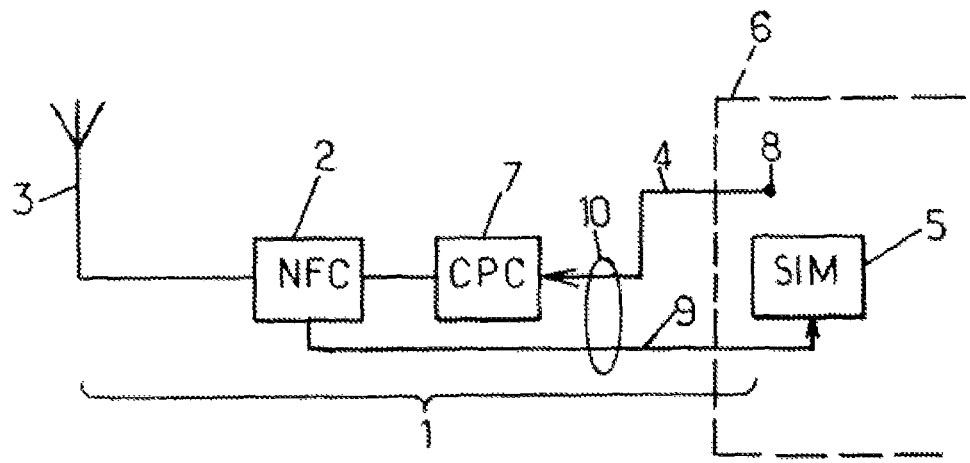
FIG. 1 illustrates an architecture of an electronic entity according to an embodiment of the invention.

FIG. 1 illustrates an architecture of an electronic entity 1 according to an embodiment of the invention. Such an electronic entity 1 is intended to be connected to a mobile terminal 6, which may be a mobile telephone for example, in order to allow providing a first electrical power supply from a pin 8 of the mobile terminal 6 to an NFC device 2, by means of a wire-based interface 10. More specifically, the wire-based interface comprises a power connection 4 between the mobile terminal 6 and a voltage converter 7. The pin 8 of the mobile terminal 6 is suitable for providing this first electrical power supply.

Advantageously, in such an architecture according to an embodiment of the invention, the voltage converter 7 allows converting this first electrical power supply into a second electrical power supply adapted for the optimum operation of the NFC device 2, regardless of the mobile terminal power source.

Then the NFC device 2 presents a power output which is adapted to provide the third electrical power supply to the SIM card 5. For this purpose, the wire-based interface 10 comprises a power connection 9 from the NFC device to the SIM card.

The electronic entity 1 may additionally comprise a protocol connection (not illustrated in FIG. 1) in its wire-based interface, linking a pin of the NFC device to a corresponding pin of the SIM card, allowing the NFC device to intercept protocol data flows between the mobile terminal and SIM card. As a general rule, it is advantageous to apply the present invention to a mobile terminal which does not have NFC functionalities. In such cases, it is conventional to connect the pin provided for protocol exchanges, referred to as the SWP (Single Wire Protocol) pin of the SIM card, to the ground of the mobile terminal. In one embodiment the SWP pin is not connected to the ground of the mobile terminal, so it can be connected to the corresponding SWP pin of the NFC device.

Figure 2:
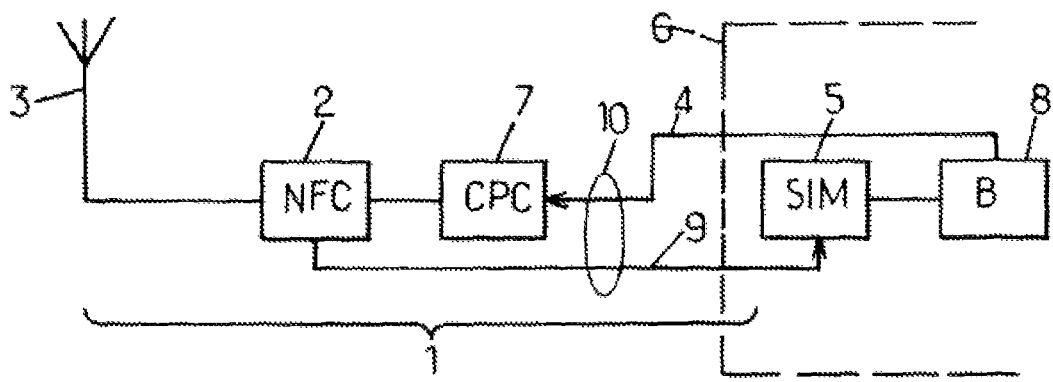
FIG. 2 illustrates the supply of power from a battery according to an embodiment of the invention.

FIG. 2 illustrates the supply of power from a battery according to an embodiment of the invention.

In this embodiment, the electrical power for the mobile terminal is supplied by a battery 8. Here, the power pin 8 of the mobile terminal therefore corresponds to the battery which provides the first electrical power supply to the voltage converter 7 in the form of a voltage $U_n$, via the wire-based interface 10.

Then, with this architecture, the voltage converter 7 converts the voltage $U_n$ into an output voltage $U_s$ to be supplied to the NFC device 2. Next, via the power connection 9, the NFC device then provides the third electrical power supply to the SIM card.

Figure 3:
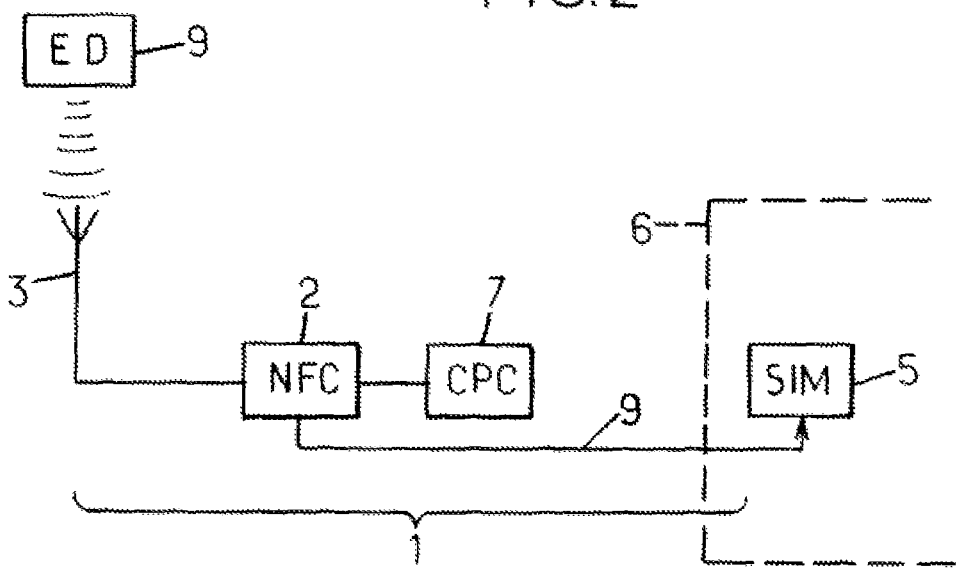
FIG. 3 illustrates the supply of power from an antenna according to an embodiment of the invention.

FIG. 3 illustrates an embodiment of the invention corresponding, for example, to the architecture of the electronic entity 1 in an operating mode called "battery-off". Battery-off mode corresponds to the mobile terminal operating without a battery because the battery is out of power or is at least considered to be out of power. It therefore involves running a contactless application on the mobile terminal, more specifically in the SIM card of the mobile terminal, without power from the battery.

It is known that an NFC device operating in "card emulator" mode receives electrical power via its antenna when it is communicating with a nearby NFC entity such as an NFC card reader. As a result, it is arranged here to supply power both to the NFC device and the SIM card, by means of this device, using this power received via the antenna. The electrical power is intended to allow transactions to be executed between the contactless application installed on the SIM card and the nearby NFC entity.

As illustrated in FIG. 3, in this power source context, the electronic entity 1, and more particularly the antenna 3, is in communication with a nearby NFC entity ED, which may therefore correspond to an NFC card reader such as a card reader of an e-payment terminal for example. In the embodiment described, the electronic entity 1 is operating in card emulator mode, meaning that it is able to communicate with nearby NFC entities ED that are card readers.

The electrical power captured by the antenna 3 passes through the NFC device 2 and is routed to the SIM card 5 via the power connection 9 of the wire-based interface 10. In the case where certain applications are implemented on the NFC device itself and powered by the power received by the antenna, it can easily be arranged so that the NFC device is supplied power under the same conditions, allowing these applications to run. In this case, the NFC device corresponds to a radio tag such as an RFID tag (Radio Frequency IDentification).

Figure 4:
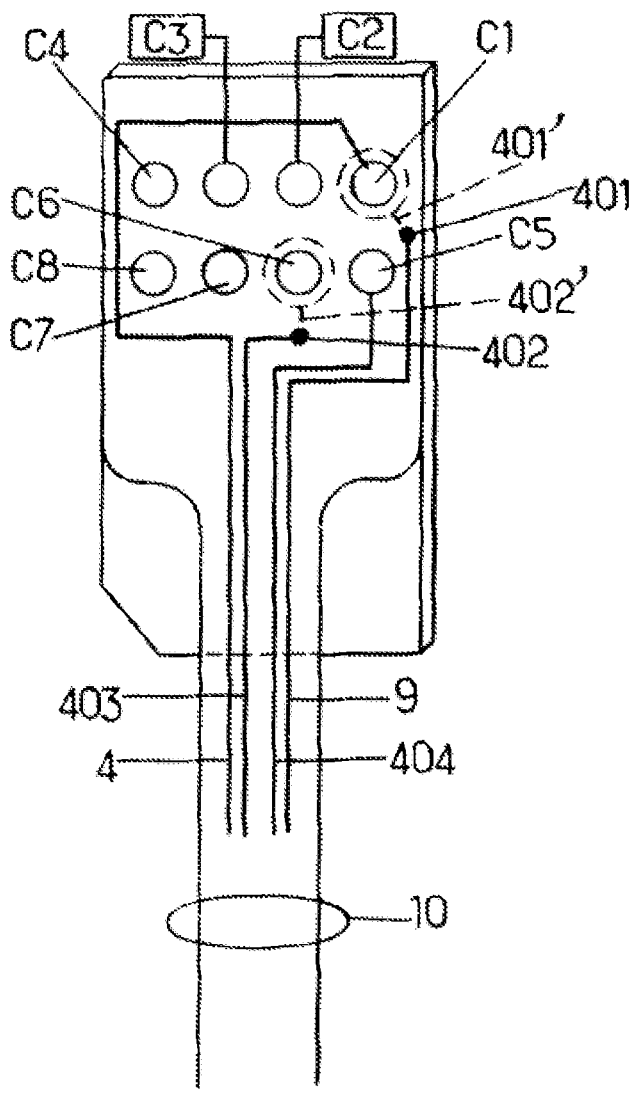
FIG. 4 illustrates means for connecting the mobile terminal and its SIM card with the electronic entity according to an embodiment of the invention, FIG. 5 provides a detailed illustration of an example of an electronic architecture implementing one of the embodiments of the invention.

FIG. 4 illustrates means of connecting the mobile terminal and its SIM card with the electronic entity according to an embodiment of the invention.

More specifically, the connecting means of the mobile terminal and its SIM card according to an embodiment are represented here with regard to the conventional contacts of the SIM card.

The SIM card is shown in outline and on this SIM card is positioned the wire-based interface 10 which is in the form of a ribbon, corresponding to a plastic film for example, according to an embodiment of the invention. This ribbon is represented in white.

Contacts C1 to C8 of the mobile terminal are intended to be connected to the corresponding contacts of the SIM card and are also represented in outline.

The contact C1 represents the power pin of the mobile terminal. Here, in an embodiment of the invention, it is arranged to "isolate" this contact C1 from the SIM card so that the NFC device can be inserted into the power flow between the mobile terminal and the SIM card. In fact, here, the power pin C1 of the mobile terminal 6 is not connected to the corresponding contact of the SIM card and is connected to the power connection 4 of the wire-based interface 10. This power connection, as illustrated in the previous figures, is connected to the voltage converter 7 in order to ultimately supply power to the NFC device 2. Then, as described above, once the NFC device 2 is supplied with power (or turned on), it is able to output the electrical power appropriate for the SIM card via the power connection 9. Lastly, this power connection 9 is connected to a pin 401 which passes through the ribbon, providing passage through the ribbon from the upper side represented in FIG. 4 to the lower side of the ribbon. Then a metal connection 401' (represented with dotted lines because it is located on the hidden side of the ribbon), on the lower side of the ribbon between the pin 401 and a contact of the SIM card conventionally referred to as C1 and for clarity called C1_SIM here, supplies power to the SIM card. Thus the contact C1 of the mobile terminal is isolated from the contact C1_SIM of the SIM, and the SIM card is supplied power by the NFC device via the power connection 9.

The contact C6 corresponds to the contact of the mobile terminal intended to be connected to a corresponding contact of the SIM card to allow exchanging data according to a communication protocol, such as a SWP protocol for example. In one embodiment of the invention, it is also arranged to position the NFC device to intercept the protocol data flow between the mobile terminal and the NFC device. For this purpose, as described above with reference to the power supply contact, the contact C6 of the mobile terminal is isolated from the SIM card. A two-way protocol connection 403 of the wire-based interface 10 then establishes a connection for this purpose between the NFC device and a corresponding contact of the SIM card conventionally denoted as C6 and here called C6_SIM for clarity. For this purpose, a conductive pin 402 routes protocol exchanges from the upper side of the ribbon to the lower side of the ribbon. A metal connection 402', on the lower side of the ribbon between the pin 402 and the contact C6_SIM of the SIM card, routes protocol exchanges between the NFC device and the SIM card. This metal connection 402', located on the lower side of the ribbon, is represented with dotted lines.

The contact C5 of the mobile terminal corresponds to the ground. The ground is also available to the electronic entity 1 by connecting a connection 404 of the wire-based interface 10 to this contact C5.

With these contact means, it is possible to implement an embodiment of the invention which allows advantageously inserting an NFC device between the mobile terminal and its SIM card, where it can intercept the flows.

Figure 5:
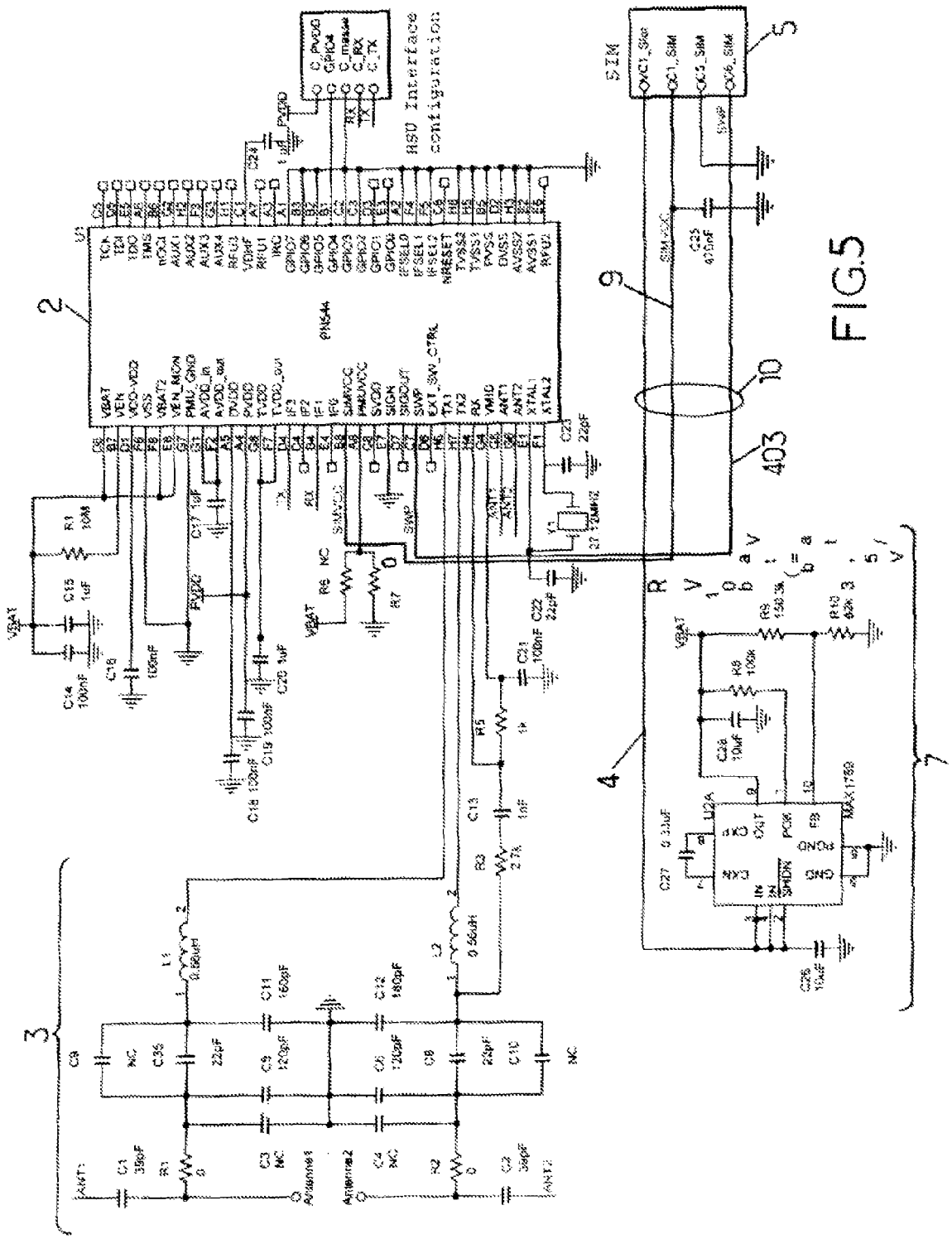

FIG. 5 provides a detailed illustration of an example of an electronic architecture implementing one of the embodiments of the invention.

It shows an electronic entity 1 of the invention, comprising an antenna 3, an NFC device 2, as well as a voltage converter 7, connected to a SIM card 5 of a mobile terminal by means of a wire-based interface 10 represented only partially in FIG. 5.

The SIM card 5 in particular has:
a contact VC1_SLOT intended to be connected to the power supply contact of the mobile terminal C1 in the conventional manner,
a contact C1_SIM intended to be connected to a power pin SIM_VCC of the NFC device 2,
a contact C5_SIM intended to be connected to the ground, and
a contact C6_SIM intended for connection according to a SWP protocol.

The voltage converter 7 comprises IN pins which are connected to the power contact C1 of the mobile terminal by the power connection 4 of the wire-based interface 10. The power contact C1 of the mobile terminal is illustrated here by the SIM card contact VC1_SLOT. The voltage converter 7 then converts the voltage received into a voltage greater than the threshold operating value of the NFC device 2. An OUT pin of the voltage converter 7, corresponding to the pin supplying the power output from the voltage converter 7, is directly connected to a pin VBAT of the NFC device 2 in order to supply it the voltage output from the voltage converter. The voltage delivered by the voltage converter 7 is greater than a threshold operating value of the NFC device 2. In the example cited, the voltage Ue between the pin VC1_Slot and the ground is 1.8V, and after conversion by the voltage converter 7, the output voltage Us corresponding to the voltage between the pin VBAT and the ground is greater than or equal to the threshold operating value of the NFC device 2, which is greater than or equal to 3V for example.

In this manner the NFC device, not initially designed for in the architecture of the mobile terminal, can receive power at the voltage of the second electrical power supply which may be different from that of the first electrical power supply and the third electrical power supply, meaning different from that of the mobile terminal. Then, the NFC device 2 is adapted to output the electrical power for the SIM card from a pin SIM-VCC, via the power connection 9 of the wire-based interface 10. This electrical power corresponds to providing power to the mobile terminal in an embodiment of the invention in order to meet existing electrical power compatibility constraints between the mobile terminal and SIM card, as explained above.

Alternatively, the NFC device 2 can be supplied voltage by the antenna 3. The antenna 3 can in this case receive energy from an NFC entity in proximity to the mobile terminal, not represented in this figure, such as a card reader for example. The pins Antenna1 and Antenna2 of the antenna 3 capture electrical energy from the nearby NFC entity which is then stored by capacitors C1 and C2 at the antenna 3. This electrical energy travels from the antenna 3 to the NFC device 2 by a wired connection between pins Antenna1 and Antenna2 of the antenna 3 and pins ANT1 and ANT2 of the NFC device 2. Be that as it may, once supplied power in this manner, the NFC device 2 is able to provide the power appropriate for the SIM card on its power out pin SIMVCC and via the power connection 9 between the pin SIMVCC of the NFC device 2 and the contact C1_SIM of the SIM card 5. The electrical energy received at the contact C1_SIM of the SIM card 5 corresponds, in the example cited above, to a voltage of 1.8V. This embodiment allows supplying power to the SIM card 5 when the battery 2 is low or even completely discharged, by using an external voltage source, namely the nearby NFC entity ED, thus allowing transactions between this entity and the contactless application installed on the SIM card.

The wire-based interface 10 also comprises a wired connection 403 between a pin SWP of the NFC device 2 and the contact C6_SIM of the SIM card 5, for carrying protocol data between the NFC device 2 and the SIM card 5.

Advantageously, the electronic circuits relating to the antenna 3, the NFC device 2, and the voltage converter 7, are implemented within the same circuit which is connected to the SIM card 5 by means of the wire-based interface 10.

For clarity, the dimensions of elements represented in these figures do not correspond to the actual dimensions nor to the ratios between actual dimension. In addition, the same references used in different figures indicate the same elements or elements with identical functions.

Figure 6:
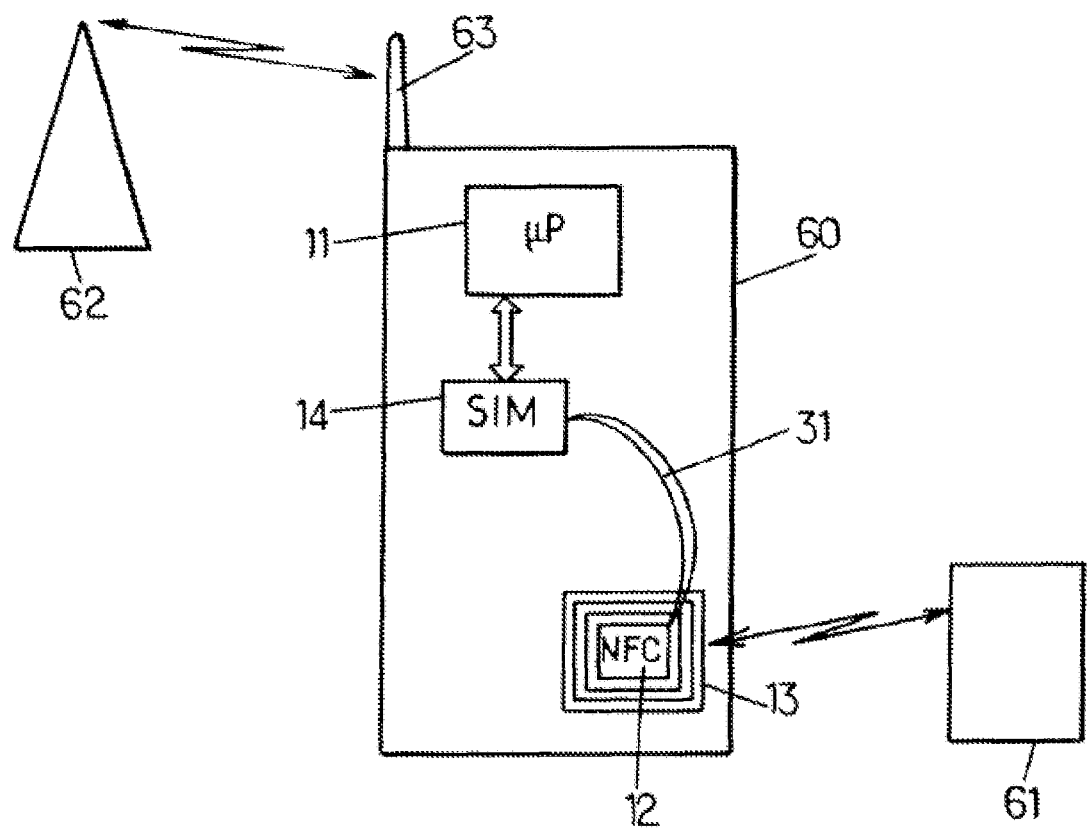
FIG. 6 illustrates a mobile telephony system according to an embodiment of the invention.

FIG. 6 illustrates a mobile telephony system according to an embodiment of the invention.

Such a system comprises a plurality of terminals 60, each one adapted for managing mobile telephony communications and for managing NFC communications, according to an embodiment of the invention.

For this purpose, the system comprises mobile telephony network equipment, such as base stations 62, with which the terminals 60 can communicate via an antenna 63 of the mobile telephone. It also comprises NFC equipment 61 for NFC applications with which the mobile telephones 60 can communicate via an antenna 13 associated with the NFC device. These two antennae 63 and 13 are respectively used in implementing the mobile telephony applications and NFC applications.

The invention claimed is:

1. An electronic entity adapted for a mobile terminal, said mobile terminal being able to comprise a subscriber identity card and able to provide a first electrical power supply suitable for operation of the subscriber identity card, said electronic entity comprising:
- a near-field communication device with which is associated a threshold operating value of the device;
- an antenna for the near-field communication device; and
- a wire-based interface intended to link the near-field communication device to the mobile terminal, said wire-based interface carrying the first electrical power supply from the mobile terminal to the near-field communication device, wherein a voltage converter receives the first electrical power supply from the terminal via the wire-based interface, and provides the near-field communication device with a second electrical power supply suitably adapted according to said threshold operating value of the device; and wherein the near-field communication device, on the basis of the second electrical power supply, provides a third electrical power supply to the subscriber identity card, said third electrical power supply having a value substantially equal to the first electrical power supply.

2. The electronic entity according to claim 1, wherein said mobile terminal is able to additionally comprise a battery suitable for connection to the wire-based interface.

3. The electronic entity according to claim 1, additionally comprising a power connection suitable for supplying electrical power from the antenna to the near-field communication device, wherein said near-field communication device provides, using the electrical power from the antenna, the third electrical power supply to the subscriber identity card via the wire-based interface.

4. The electronic entity according to claim 1, wherein the wire-based interface comprises a protocol connection between the subscriber identity card and the near-field communication device.

5. A mobile terminal, adapted both for operating in a mobile communication network and for managing near-field communications, able to comprise a subscriber identity card and able to provide a first electrical power supply suitable for operation of the subscriber identity card, said terminal including an electronic entity which comprises:
- a near-field communication device with which is associated a threshold operating value of the device;
- an antenna for the near-field communication device; and
- a wire-based interface intended to link the near-field communication device to the mobile terminal, said wire-based interface carrying the first electrical power supply from the mobile terminal to the near-field communication device, wherein a voltage converter receives the first electrical power supply from the terminal via the wire-based interface, and provides the near-field communication device with a second electrical power supply suitably adapted according to said threshold operating value of the device; and wherein the near-field communication device, on the basis of the second electrical power supply, provides a third electrical power supply to the subscriber identity card, said third electrical power supply having a value substantially equal to the first electrical power supply.

6. The mobile terminal according to claim 5, able to additionally comprise a battery suitable for connection to the wire-based interface.

7. The mobile terminal according to claim 5, wherein the electronic entity additionally comprises a power connection suitable for supplying electrical power from the antenna to the near-field communication device, wherein said near-field communication device provides, using the electrical power from the antenna, the third electrical power supply to the subscriber identity card via the wire-based interface.

8. The mobile terminal according to claim 5, wherein the wire-based interface comprises a protocol connection suitable for communication between the subscriber identity card and the near-field communication device.

9. A mobile communication system comprising a plurality of mobile terminals according to claim 5.

* * * * *